US012807202B2

(12) United States Patent
Epperson et al.

(10) Patent No.: US 12,807,202 B2
(45) Date of Patent: Nov. 24, 2026

(54) CARGO PLATFORMS WITH EXTENDABLE GATES

(71) Applicant: Toyota Motor North America, Inc., Plano, TX (US)

(72) Inventors: Adam M. Epperson, Haubstadt, IN (US); David W. Johns, Boonville, IN (US); Jeffery P. Long, Oakland City, IN (US); Travis Hart, Evansville, IN (US)

(73) Assignees: Toyota Motor North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 221 days.

(21) Appl. No.: 18/739,483

(22) Filed: Jun. 11, 2024

(65) Prior Publication Data

US 2025/0376201 A1 Dec. 11, 2025

(51) Int. Cl.

*B62B 3/02* (2006.01)
*B62B 3/04* (2006.01)
*B62B 5/00* (2006.01)

(52) U.S. Cl.

CPC .................. *B62B 3/02* (2013.01); *B62B 3/04* (2013.01); *B62B 5/0009* (2013.01); *B62B 2203/00* (2013.01); *B62B 2206/04* (2013.01)

(58) Field of Classification Search

CPC ......... B62B 2206/04; B62B 3/02; A47B 1/00; A47B 1/08; A47B 1/10; A47B 21/03; B65G 13/12

See application file for complete search history.

(56) References Cited

U.S. PATENT DOCUMENTS 622,666 A * 4/1899 Burwell .................. E04G 1/152 211/153
2,650,731 A * 9/1953 Adler .................... B62B 5/0003 104/246

(Continued)

FOREIGN PATENT DOCUMENTS

DE 102016121749 A1 * 5/2018 ............. B62B 3/005
EP 1961692 A2 * 8/2008 ............. B62B 1/268
WO WO-2024214866 A1 * 10/2024 ............... A47B 3/08

OTHER PUBLICATIONS

AEROEXPO. "Container Dolly—70—TT—FS—Viking Trailers International—for ULD / pallet / 2-axle" Retrieved from the Internet: <https://www.aeroexpo.online/prod/viking-trailers-international/product-174858-12102.html> Retrieved May 14, 2024.

(Continued)

*Primary Examiner* — Alexander K Garlen
(74) *Attorney, Agent, or Firm* — Christopher G. Darrow; Darrow Mustafa PC

(57) ABSTRACT

Systems, methods, and other embodiments described herein relate to a cargo platform with extendable gates. In one embodiment, a cargo platform includes a stationary base. The cargo platform also includes a first extendable gate slidably coupled to the stationary base. The first extendable gate includes a first set of rails. The first extendable gate is extendable away from the stationary base in a first lateral direction. The cargo platform also includes a second extendable gate slidably coupled to the stationary base. The second extendable gate includes a second set of rails. The second extendable gate is extendable away from the stationary base in a second lateral direction opposite the first lateral direction. When the extendable gates are retracted, the second set of rails interlace with the first set of rails.

9 Claims, 7 Drawing Sheets

(56) References Cited

U.S. PATENT DOCUMENTS

| | | | | |
|---|---|---|---|---|
| 3,655,076 | A | 4/1972 | Carder et al. | |
| 3,690,485 | A * | 9/1972 | Fischer ................ | B65D 88/129<br>414/416.12 |
| 4,347,794 | A * | 9/1982 | Nordstrom ............... | B65G 7/04<br>193/35 MD |
| 8,469,329 | B2 | 6/2013 | Tygard | |
| 10,507,992 | B2 | 12/2019 | Tackett et al. | |
| 10,589,937 | B1 | 3/2020 | Allen et al. | |
| 2005/0039641 | A1 * | 2/2005 | Metcalf ................ | A47B 96/025<br>108/106 |
| 2007/0138116 | A1 * | 6/2007 | Metcalf ................ | A47B 96/025<br>211/90.01 |
| 2009/0266780 | A1 * | 10/2009 | Metcalf ................ | A47B 96/025<br>211/134 |
| 2020/0391986 | A1 | 12/2020 | Picha | |
| 2023/0126064 | A1 | 4/2023 | Barsamian | |
| 2023/0286094 | A1 | 9/2023 | Tsuruta | |
| 2023/0373373 | A1 | 11/2023 | Hoeper et al. | |
| 2024/0109730 | A1 | 4/2024 | Dupre et al. | |

OTHER PUBLICATIONS

Soco System. "Transfer trolleys—Soco System", Retrieved from the Internet: <https://www.socosystem.com/world/products/pallet-handling/pallet-transfer-trolleys/transfer-trolleys>, Retrieved May 14, 2024.

* cited by examiner

CARGO PLATFORMS WITH EXTENDABLE GATES

TECHNICAL FIELD

The subject matter described herein relates, in general, to commodity transport systems and, more particularly, to a moveable cargo platform with extendable gates.

BACKGROUND

Millions of products are made and assembled every day at manufacturing facilities across the globe. Tens, hundreds, or thousands of different components move in, out, and through these manufacturing facilities. In one example, a manufacturing facility includes different stations where different manufacturing and assembly operations are carried out. For example, a facility may include a painting station where a component is painted. Following painting, a batch of the components may be transferred within the facility or to another facility, where they are assembled with other components as part of a completed product. As a particular example, a vehicle is made up of various components. A vehicle manufacturing campus may be extensive, with multiple buildings spread over multiple acres. Different components may be formed at different sites and brought together at a single site to be assembled.

Furthermore, it may be the case that some components of a product may be produced by a third party at a remote facility. In this example, components from a remote third party may be received at a receiving dock, where they are moved to a location where they are incorporated into the finished product. For example, specific instrument panel components may be fabricated by a third party and shipped to the vehicle manufacturer for assembly into a vehicle.

In these and other examples, the components, which in some examples may be large and heavy, are transported through a manufacturing facility on wheeled dollies. In other words, wheeled dollies facilitate the movement of products and/or components throughout a facility.

SUMMARY

In one embodiment, example cargo platforms provide improved cargo transport and movement between different manufacturing stations. These platforms are equipped with extendable gates, which are designed to extend and retract as needed, allowing for easy loading and unloading of components.

In one embodiment, a cargo platform is disclosed. The cargo platform includes a stationary base. The cargo platform also includes a first extendable gate slidably coupled to the stationary base and comprising a first set of rails. The first extendable gate is extendable away from the stationary base in a first lateral direction. The cargo platform also includes a second extendable gate slidably coupled to the stationary base and comprising a second set of rails. The second extendable gate is extendable away from the stationary base in a second lateral direction opposite the first lateral direction. When the extendable gates are retracted, the second set of rails interlaces with the first set.

BRIEF DESCRIPTION OF THE DRAWINGS

The accompanying drawings, which are incorporated in and constitute a part of the specification, illustrate various systems, methods, and other embodiments of the disclosure.

It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
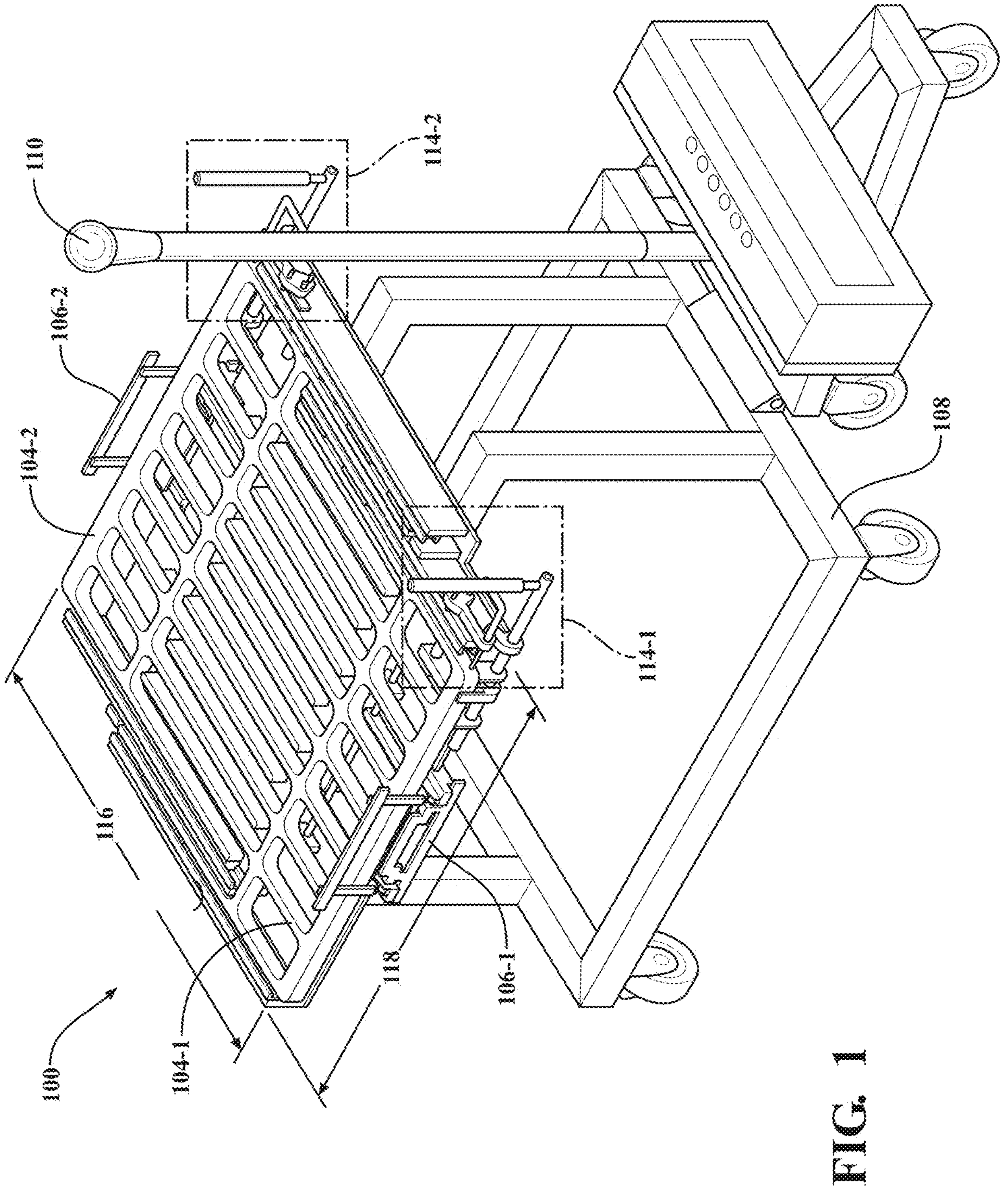
FIG. 1 is an isometric view of a cargo platform installed on a cargo dolly.

Systems, methods, and other embodiments associated with improving cargo transport via a cargo platform with extendable side gates that facilitate lineside delivery of cargo to a manufacturing station are disclosed herein. As previously described, in a manufacturing facility, certain components manufactured at a separate facility or previously operated on at a different location within the facility are delivered to the assembly lineside via dollies. A dolly is a wheeled transport that an operator may drive, or that may be manually maneuvered by an operator. In either case, a dolly has a wheeled base to carry cargo across a manufacturing facility. However, due to the limited maneuverability of these dollies, the cart of delivered cargo may be spaced apart from the assembly line where it is to be delivered. This is particularly problematic when the cargo is large and/or heavy such that an operator cannot readily move the cargo from the dolly to the assembly line location.

Accordingly, the cargo platform of the present specification is attached to a dolly and allows for facile lineside delivery of cargo to a manufacturing station, such as a conveyor system, even when the cargo dolly is spaced apart from the manufacturing station. In general, the cargo platform is mounted to a dolly and includes a stationary base. Extendable gates are mounted to the stationary base and extend in either direction laterally away from the stationary base. The cargo platform facilitates the facile loading of cargo onto an assembly station, such as a conveyor belt, notwithstanding any space between the dooly and the assembly lineside that may result from the difficultly maneuvered dolly. When placed along an assembly lineside, a gate is extended to form a bridge between the dolly and the assembly lineside. Each gate may be topped with conveyor balls so the cargo can be slid from the dolly to the assembly lineside. The platform includes two extendable gates, one on either side. As such, the cargo platform allows for cargo delivery from either side of the dolly. Moreover, each gate may be continuously extended (rather than discretely) to accommodate various distances between the delivery dolly and the assembly lineside equipment.

The cargo platform further includes a multi-lock locking system which a team member disengages before extending the gate. The cargo platform further includes a rack bar and pin to prevent the set of gates from inadvertently retracting during cargo manipulation.

In an example, each gate includes a vertically-mounted guard rail assembly to keep the cargo in place during transit. A riser of the guard rail assembly retracts during gate extension to facilitate cargo movement.

In this way, the disclosed cargo platform enhances the delivery capabilities of cargo to an assembly line by 1) providing an adjustable length bridge between a cargo dolly and the manufacturing/assembly station to facilitate cargo delivery from the cargo dolly to the manufacturing/assembly station, 2) facilitating loading/unloading on either side of the dolly, and 3) enhancing team member and commodity safety via the locks and rack slider and pin slider. The cargo platform is width adjustable to accommodate different spacings between the dolly and the assembly line. Specifically, the cargo platform promotes process flexibility by 1) allowing cargo to be delivered from either side of a dolly, 2) allowing for various distances between the cargo platform and assembly lineside equipment, and 3) facilitating the transport of oversized cargo. Furthermore, the cargo platform promotes safety with 1) enhanced ergonomics, 2) reduced operator interaction during delivery, and 3) the automatically retractable cargo guard rail.

Turning now to the figures, FIG. 1 is an isometric view of an assembled cargo platform 100 installed on a cargo dolly 108. It will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein.

As described above, the cargo platform 100 facilitates the movement of cargo throughout a facility, such as a vehicle manufacturing facility. In an example, the cargo platform 100 may be mounted to a cargo dolly 108. The cargo dolly 108 is a wheeled transport device on which cargo may be positioned and transported throughout a facility. As described above, the cargo dolly 108 may be a trailer that is driven by a tractor-type vehicle or manually operated via a driver pulling on a handle of the cargo dolly 108. In either case, the cargo platform 100 may be rigidly attached to the cargo dolly 108, for example, via bolts to a rigid surface of the cargo dolly 108, to facilitate movement of the cargo and delivery of such to the assembly lineside.

In general, the cargo platform 100 includes a stationary base 102. The stationary base 102 serves as a point of attachment of the cargo platform 100 to the cargo dolly 108 and as a foundation for certain components, such as slide rails and slide stops, which facilitate the extension and retraction of the extendable gates 104-1 and 104-2. Additional details regarding the components that facilitate the extension and retraction of the extendable gates 104-1 and 104-2 are provided below in connection with FIGS. 2 and 3.

The stationary base 102 may also support various components of the locking systems 114-1 and 114-2 that maintain associated extendable gates 104-1 and 104-2 in retracted or extended positions. Additional details regarding the components of the locking systems 114-1 and 114-2 are provided below in connection with FIGS. 2, 4A, and 4B.

The stationary base 102 may also support various components that facilitate the operation of the automatically retracting and extending vertical guard rail assemblies 106-1 and 106-2. Additional details regarding the components that facilitate the operation of the automatically retracting and extending vertical guard rail assemblies 106-1 and 106-2 are provided below in connection with FIGS. 2 and 5A-5F.

In an example, the stationary base 102 may have a width 116 of between 40 and 50 inches, such as 48 inches. As described above, the width 116 of the cargo platform 100 may change based on the extension of the extendable gates 104. Example dimensions of the cargo platform 100 with different extendable gates 104 extended are provided below in connection with FIG. 3. In an example, the length 118 of the stationary base 102 may be between 40-70 inches, for example, 48 or 62 inches. While specific reference is made to specific stationary base 102 dimensions, the stationary base 102 and other components of the cargo platform 100 may have different dimensions.

As described above, the cargo platform 100 facilitates the sliding of cargo laterally off the cargo dolly 108 to the assembly lineside. Accordingly, the cargo platform 100 includes a first extendable gate 104-1 that is slidably coupled to the stationary base 102 and extendable away from the stationary base 102 in a first lateral direction. Thus, the first extendable gate 104-1 facilitates cargo delivery from the cargo platform 100 to an assembly lineside on the first side of the cargo dolly 108. Specifically, the stationary base 102 includes a pair of rails that are coupled to associated rails of the first extendable gate 104-1 via bearings such that the first extendable gate 104-1 may extend outward from the stationary base 102. Additional details regarding the slidable coupling between the stationary base 102 and the first extendable gate 104-1 are provided below in connection with FIGS. 2 and 3. As depicted in FIG. 1, the first extendable gate 104-1 includes a first set of rails, or fingers, that intermesh with the fingers of the second extendable gate 104-2 when retracted.

As described above, the cargo platform 100 facilitates the delivery of cargo from either side of the cargo platform 100. As such, the cargo platform 100 includes a second extendable gate 104-2 that is also slidably coupled to the stationary base 102 via a number of bearing-based slide rails/tracks. The second extendable gate 104-2 is extendable away from the stationary base 102 in a second lateral direction opposite the first lateral direction. Thus, the second extendable gate 104-2 facilitates cargo delivery from the cargo platform 100 to an assembly lineside on the second side of the cargo dolly 108. As with the first extendable gate 104-1, the second extendable gate 104-2 includes a second set of rails or fingers. When both gates are in a retracted position, the second set of rails interlace with the first set of rails, as depicted in FIG. 1. The interlacing of these gate rails facilitates the expandability of the width 116 of the cargo platform 100.

Figure 2:
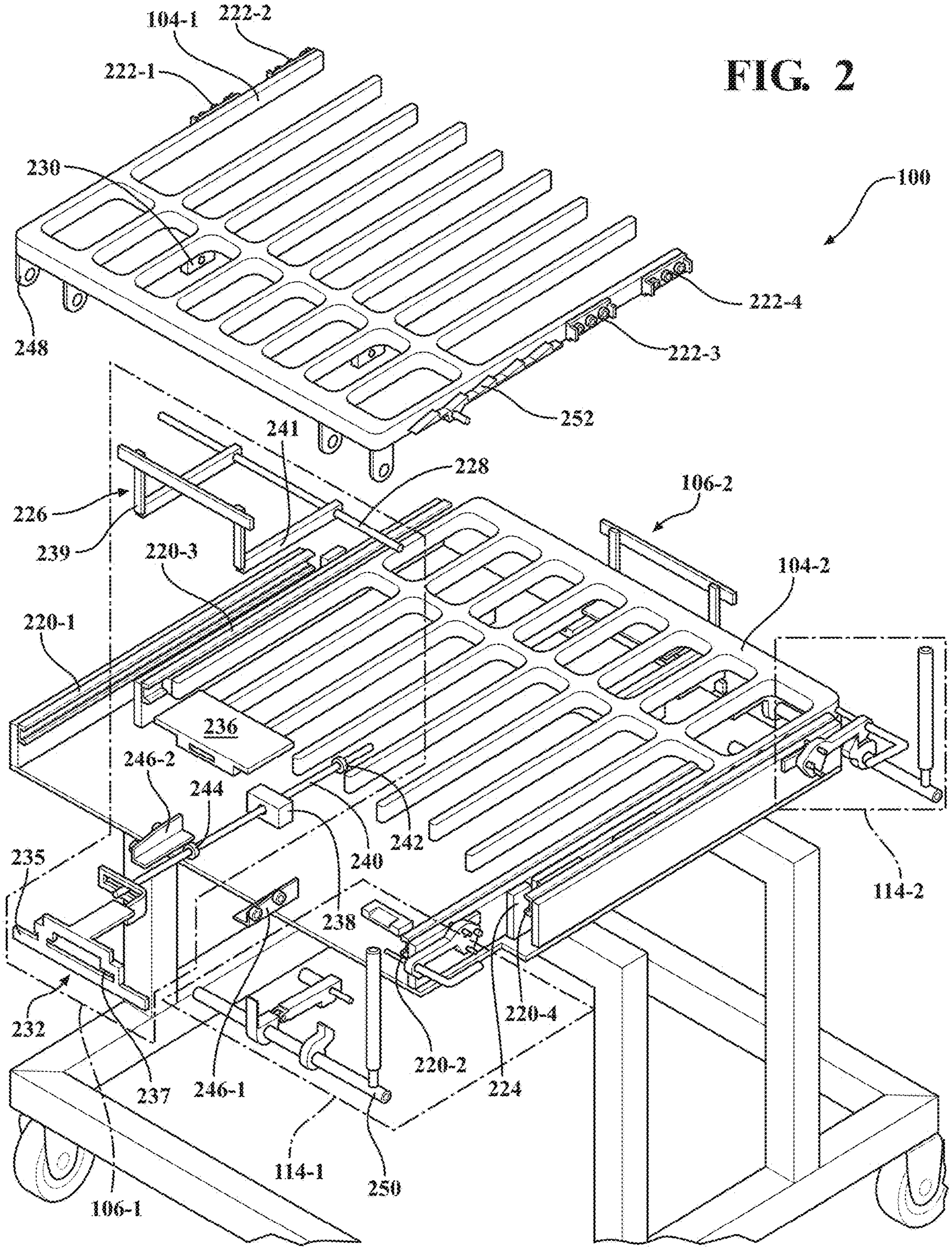
FIG. 2 is an isometric and exploded view of the cargo platform.
Figure 3:
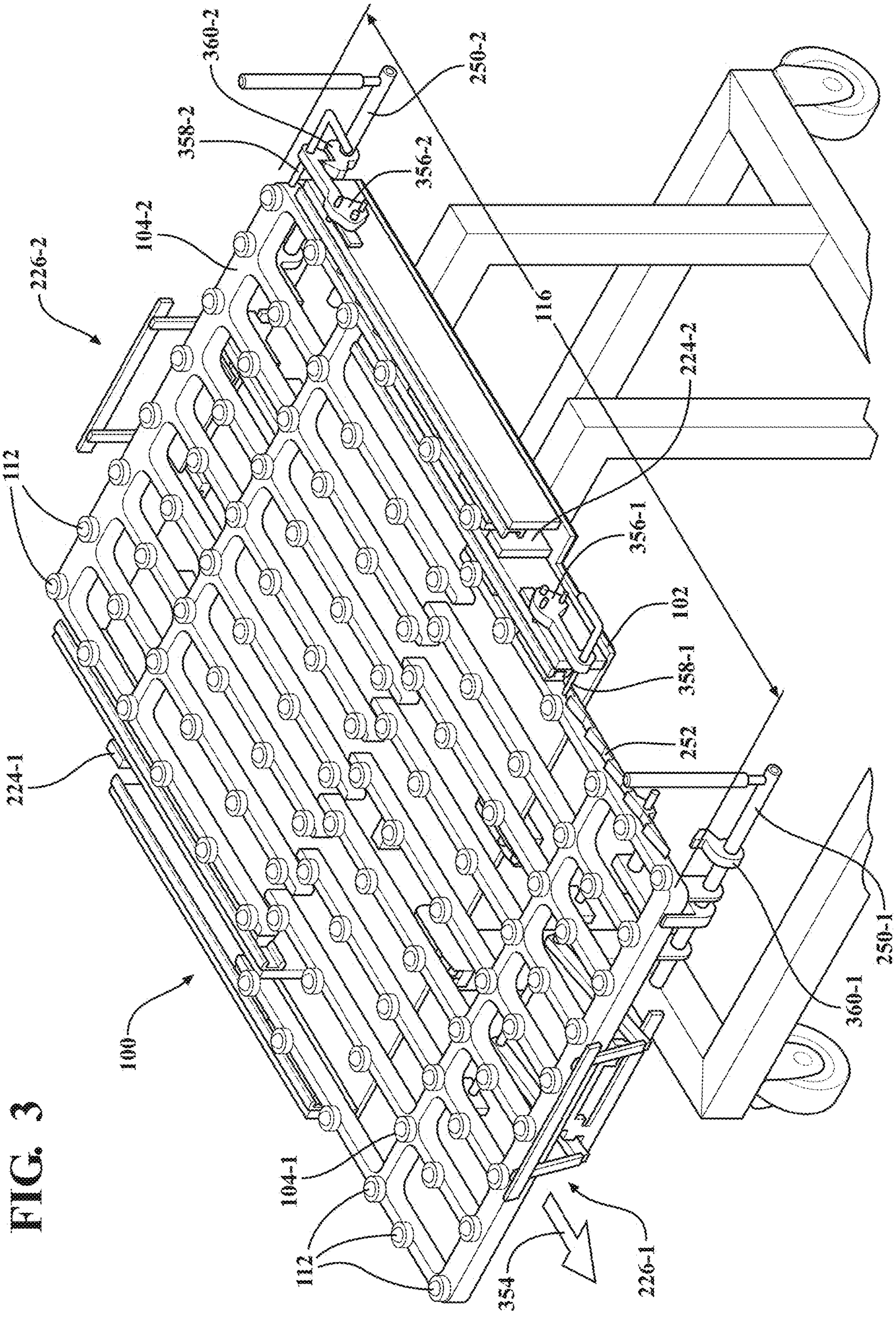
FIG. 3 is an isometric view of a first extendable gate in an extended position.

As depicted in FIG. 3 below, the cargo platform 100 may include ball rollers 112 on top of the first and second sets of rails. In general, the ball rollers 112 are rotationally mounted spheres within a casing. That is, the ball may move within the casing. As an operator pushes/pulls on the cargo, the balls within the casing rotate. Thus, the ball rollers 112 provide a low friction surface across which cargo, even heavy cargo, can be easily translated or slid. For simplicity in depicting other features of the cargo platform, the ball rollers 112 are omitted from the views depicted in FIGS. 1, 2, and 4A-5F.

In an example, the cargo platform 100 includes a set of locking systems 114-1 and 114-2 to retain an associated extendable gate 104 in a retracted position. Specifically, the cargo platform 100 includes a locking system 114-1 and 114-2 per extendable gate 104-1 and 104-2. The locking systems 114-1 and 114-2 ensure that the respective extendable gate 104-1 and 104-2 remains in an extended position or a retracted position as desired. That is, were the extendable gates 104-1 and 104-2 able to freely extend and retract, the extendable gates 104-1 and 104-2 may extend during cargo transport or retract during cargo loading. Either of these scenarios could pose a hazard to a team member and/or damage the cargo or manufacturing equipment.

Note that while FIG. 1 depicts the locking systems 114-1 and 114-2 on particular corners of the cargo platform 100, these locking systems 114-1 and 114-2 may be placed at different locations on the cargo platform 100. For example, with the first locking system 114-1 placed in a front corner of the cargo platform 100 as depicted in FIG. 1, the second locking system 114-2 may be 1) at a front corner of the opposite lateral side of the cargo platform 100 as depicted in FIG. 1 or 2) at the rear corner of the opposite lateral side of the cargo platform 100. Similarly, with the second locking system 114-2 placed in a front corner of the cargo platform 100 as depicted in FIG. 1, the second locking system 114-2 may be 1) at a front corner of the opposite lateral side of the cargo platform 100 as depicted in FIG. 1 or 2) at the rear corner of the opposite lateral side of the cargo platform 100. In any case, the cargo platform 100 may include a locking system 114-1 and 114-2 per extendable gate 104-1 and 104-2 to regulate gate movement during transit and/or during loading.

In one particular example, a locking system 114 is electronically coupled to a notification system of the cargo dolly 108. For example, when both extendable gates 104-1 and 104-2 are fully retracted, as depicted in FIG. 1, a notification element, such as a light 110, may illuminate with particular characteristics to notify the operator that the cargo is secured and ready for transport and the extendable gates 104-1 and 104-2 are closed. Additional details regarding the operation of the locking systems 114 are provided below in connection with FIGS. 4A and 4B.

The cargo platform 100 may include vertically extending guard rail assemblies 106-1 and 106-2. Specifically, the cargo platform 100 includes a first vertically-extending guard rail assembly 106-1 attached to a distal end of the first extendable gate 104-1 and a second vertically-extending guard rail assembly 106-2 attached to a distal end of the second extendable gate 104-2, with the term "distal end" referring to a portion of a respective extendable gate 104 that is farthest from the stationary base 102 when the extendable gate 104 is in an extended state. During transit, as depicted in FIG. 1, risers of the guard rail assemblies 106-1 and 106-2 may be raised to ensure that the cargo does not fall off the cargo dolly 108. However, as an associated extendable gate 104 is extended, a riser of the associated guard rail assembly 106 retracts such that cargo may be moved off the cargo platform 100. When the associated extendable gate 104 is retracted following loading/unloading of the cargo, the risers are again elevated to secure the cargo on the cargo platform 100. Additional details regarding the retraction/extension of the risers are provided below in connection with FIGS. 5A-5F.

As such, the cargo platform 100 of the present specification describes a system that facilitates the ergonomic, flexible, and effective delivery of cargo from a cargo dolly 108 to an assembly lineside or any other station within a manufacturing facility.

FIG. 2 is an isometric and exploded view of the cargo platform 100. That is, FIG. 2 depicts various elements in an exploded view to illustrate certain features of the cargo platform 100. As described above, the cargo platform 100 includes a stationary base 102, which is affixed or otherwise mounted to the surface of the cargo dolly 108. The stationary base 102 provides a frame from which the extendable gates 104-1 and 104-2 can extend. In general, the stationary base 102 may be formed of a rigid material such as steel, aluminum, or another rigid material.

As described above, the stationary base 102 includes components that support various systems of the cargo platform 100. For example, gate extension/retraction supporting components may be mounted on the stationary base 102. As described above, the stationary base 102 may include slide tracks 220-1, 220-2, 220-3, and 220-4 that interface with respective wheel sets 222-1, 222-2, 222-3, and 222-4 coupled to side surfaces of the respective extendable gates 104-1 and 104-2. For example, the stationary base 102 may include a first pair of ball-bearing slide tracks 220-1 and 220-2 formed on vertically extending walls of the stationary base 102. The first pair of slide tracks 220-1 and 220-2 interface with the wheel sets 222-1, 222-2, 222-3, and 222-4 of the outermost rails of the first extendable gate 104-1. This interaction facilitates the extension and retraction of the first extendable gate 104-1. The stationary base 102 may include a second set of ball-bearing slide tracks 220-3 and 220-4 formed on vertically extending walls of the stationary base 102. The second pair of slide tracks 220-3 and 220-4 interface with the wheel sets (not shown) on the second extendable gate 104-2 to facilitate the extension and retraction of the second extendable gate 104-2. The stationary base 102 may also include slide stops 224 that define the stopping (i.e., retracted) position of the associated extendable gate during retraction and prevent over-retraction of the extendable gates 104-1 and 104-2. These slide stops 224 may be mounted to the respective vertical walls of the stationary base 102. For example, a first slide stop 224 may prevent the second extendable gate 104-2 from going too far into a retracted state, which could damage other components of the cargo platform 100.

FIG. 2 also depicts various components that make up the guard rail assemblies 106-1 and 106-2 and facilitate the retraction and extension of risers 226 as the associated extendable gate 104 is extended and retracted, respectively. Some of these components are mounted to the stationary base 102 or respective extendable gate 104. For simplicity, the components of a first guard rail assembly 106-1 are depicted in exploded form. However, similar components may be found on the second vertically extending guard rail assembly 106-2 as well.

Specifically, FIG. 2 depicts a riser 226, which may, when extended, rise above the first extendable gate 104-1 rails by between 2-6 inches, for example, 4 inches. The riser 226 includes horizontal catches 239 and arms 241 that, when interacting with the riser support 232, hold the riser 226 in a raised or lowered position as described below in connection with FIGS. 5A-5F.

This riser 226 is rotatably coupled to the underside of the first extendable gate 104-1 via riser shaft carrier bearings 230. That is, the riser 226 may include a shaft 228, which is positioned within respective openings of the gate-mounted riser shaft carrier bearings 230. For simplicity, in FIG. 2, a single riser shaft carrier bearing 230 is identified with a reference number. This rotational coupling allows the riser 226 to drop below a level of the cargo, as depicted in FIG. 5B, during cargo loading/unloading.

The guard rail assembly 106 also includes a riser support 232. When the first extendable gate 104-1 is in a retracted position, horizontal upper supports 237 and the roller sets hold the riser 226 in the elevated position as depicted in FIGS. 5E and 5F. When the first extendable gate 104-1 extends, the riser support 232 is retracted such that the riser 226 falls to horizontal lower supports 235 of the riser support 232, as depicted in FIG. 5B. The riser support 232 is slidably mounted within a support base 236, which is rigidly affixed to an underside of the first extendable gate 104-1. That is, the support base 236 is rigidly mounted to the underside of the first extendable gate 104-1 and moves with the first extendable gate 104-1. As described in more detail below with regards to FIGS. 5A-5F, the riser support 232 translates with the first extendable gate 104-1 until the interaction between collars 242 and 244 on a tie rod 240 is blocked by a slide block 238. At the point of this interaction, the riser support 232 slides within a slot in the support base 236. As described herein, the interaction between the collars 242 and 244 and the slide block 238 moves the riser support 232 into and out of a support position below the riser 226. That is, the riser support 232 passes through a slot in the support base 236. As such, the riser support 232 extends/retracts with the first extendable gate 104-1 as defined by the collars 244 and 242 on the tie rod 240. The first guard rail assembly 106-1 further includes a pair of roller sets 246-1 and 246-2. As depicted in FIGS. 5A-5F and described in the associated text, the roller sets 246-1 and 246-2 elevate the riser 226 to the elevated position upon retraction of the first extendable gate 104-1. Additional details regarding this interaction are provided below in connection with FIGS. 5A-5F.

FIG. 2 also depicts the locking systems 114-1 and 114-2. As will be described in more detail below in regards to FIGS. 4A and 4B, the locking systems 114-1 and 114-2 include various components which are rotated to unlock/lock a respective extendable gate 104-1 and 104-2. Some of these components may be mounted to a shaft 250, which is rotationally coupled to the first extendable gate 104-1 via a set of lock shaft carrier bearings 248. That is, the shaft 250, to which various components of the locking system 114 are mounted, is positioned within respective openings of the gate-mounted lock shaft carrier bearings 248. For simplicity, in FIG. 2, a single lock shaft carrier bearing 248 is identified with a reference number.

FIG. 3 is an isometric view of the first extendable gate 104-1 in an extended position. As described above, the extendable gates 104-1 and 104-2 are extendable laterally away from the stationary base 102. Specifically, the first extendable gate 104-1 is extendable in an extension direction 354, while the second extendable gate 104-2 is extendable in the opposite direction. In an example, when one extendable gate 104 is in the extended state, the cargo platform 100 may have a width of between 65-70 inches, for example, 68.75 inches. Given a retracted width of 48 inches, the extension of the first extendable gate 104-1 may extend to between 35% and 50% of the stationary base 102. While FIG. 3 depicts the extension of the first extendable gate 104-1, the second extendable gate 104-2 may also extend and, in some examples may co-extend with the first extendable gate 104-1. That is, both the first extendable gate 104-1 and the second extendable gate 104-2 may extend at the same time. The width of the cargo platform 100 when both extendable gates 104-1 and 104-2 are extended may be between 80 and 90 inches, for example, 86.75 inches. Note that as the extendable gates 104-1 and 104-2 are continuously extendable, the cargo platform 100 may provide any bridge widths between the width of the stationary base 102 when the extendable gates 104-1 and 104-2 are in the retracted state (e.g., 48 inches) and a width when both gates are extended (e.g., 87 inches). Thus, the interlaced extendable gates 104-1 and 104-2 provide a number of cargo dolly to assembly lineside bridge widths based on which extendable gates 104-1 and 104-2 are extended.

FIG. 3 also depicts various features described above, such as a first slide stop 224-1, which defines a stop position for the first extendable gate 104-1, and a second slide stop 224-2, which defines a stop position for the second extendable gate 104-2 as well as the first riser 226-1 and second riser 226-2.

FIG. 3 also depicts the ball rollers 112 that sit on top of the respective extendable gates 104-1 and 104-2. As described above, the ball rollers 112 include spheres that are able to rotate within a casing. As cargo is pulled across the top of the ball rollers 112, the balls rotate thus providing a low friction surface across which heavy cargo can be moved. For simplicity, a few instances of ball rollers 112 are depicted with reference numbers.

As described above, the locking system 114 of the respective extendable gates 104 retains the associated extendable gate 104 in a retracted position or an extended position. FIG. 3 depicts the first locking system 114-1 retaining the first extendable gate 104-1 in the extended position and a second locking system 114-2 retaining the second extendable gate 104-2 in the retracted position.

Regarding the locking system 114 maintaining an associated extendable gate 104 in an extended position, each locking system 114 includes a ratchet bar 252 and a pin 358 on the first latch 356 of the locking system 114. As depicted in FIG. 3, the ratchet bar 252 is mounted to a side surface of the associated extendable gate 104 and includes angled or saw-shaped teeth. As depicted in FIG. 3, when extended, a first pin 358-1 of a first latch 356-1 coupled to a vertical wall of the stationary base 102 interacts with these teeth to prevent the retraction of the first extendable gate 104-1. That is, as depicted in FIG. 3, when the first pin 358-1 is in a downward position, the first extendable gate 104-1 may be extended out. However, while engaged, the first pin 358-1 interfaces with the vertical walls of a particular tooth to prevent the first extendable gate 104-1 from inadvertently retracting.

For example, as cargo is loaded on the cargo platform 100, the force of the cargo moving towards the center of the cargo platform 100 (in a direction opposite the extension direction 354) may cause the first extendable gate 104-1 to slide inward, which could damage the cargo, result in the cargo falling to the floor and/or injuring the operator. The interaction between the first pin 358-1 and the ratchet bar 252 prevents such undesired gate retraction. That is, the locking system 114 includes a ratchet bar 252 affixed to the side surfaces of the associated extendable gate 104 and a pin 358 coupled to a first latch 356. The pin 358 interacts with the teeth of the ratchet bar 252 to prevent retraction of the associated extendable gate 104. As depicted below in connection with FIGS. 4A and 4B, rotation of the first latch 356 in a first rotational direction while the associated extendable gate 104 is extended disengages the pin 358 from the ratchet bar 252 such that the extendable gate 104 may be retracted. Note that the pin 358-2 of the latch 356-2 of the second extendable gate 104-2 is disengaged from the respective ratchet bar 252 of the second extendable gate 104-2.

Regarding the locking system 114 maintaining an associated extendable gate 104 in a retracted position, the locking system 114 includes a locking hook 360 attached to a respective shaft 250 rotationally coupled to a distal end of the respective extendable gate (e.g., the second extendable gate 104-1 depicted in FIG. 3). The first latch 35, described above, is attached to a side surface of the stationary base 102. As depicted in FIG. 3, the latch 356-2 adjacent to the second extendable gate 104-1 interacts with the locking hook 360-2 on the shaft 250-2 of the second extendable gate 104-2 to retain the associated extendable gate 104 in the retracted position. As depicted in FIG. 4B below, rotation of the first latch 356 disengages the first latch 356 from the locking hook 360. Note that the first latch 356-1 on the shaft 250-1 of the first extendable gate 104-1 is disengaged from the respective locking hook 360-1 of the first extendable gate 104-1.

Figure 4A:
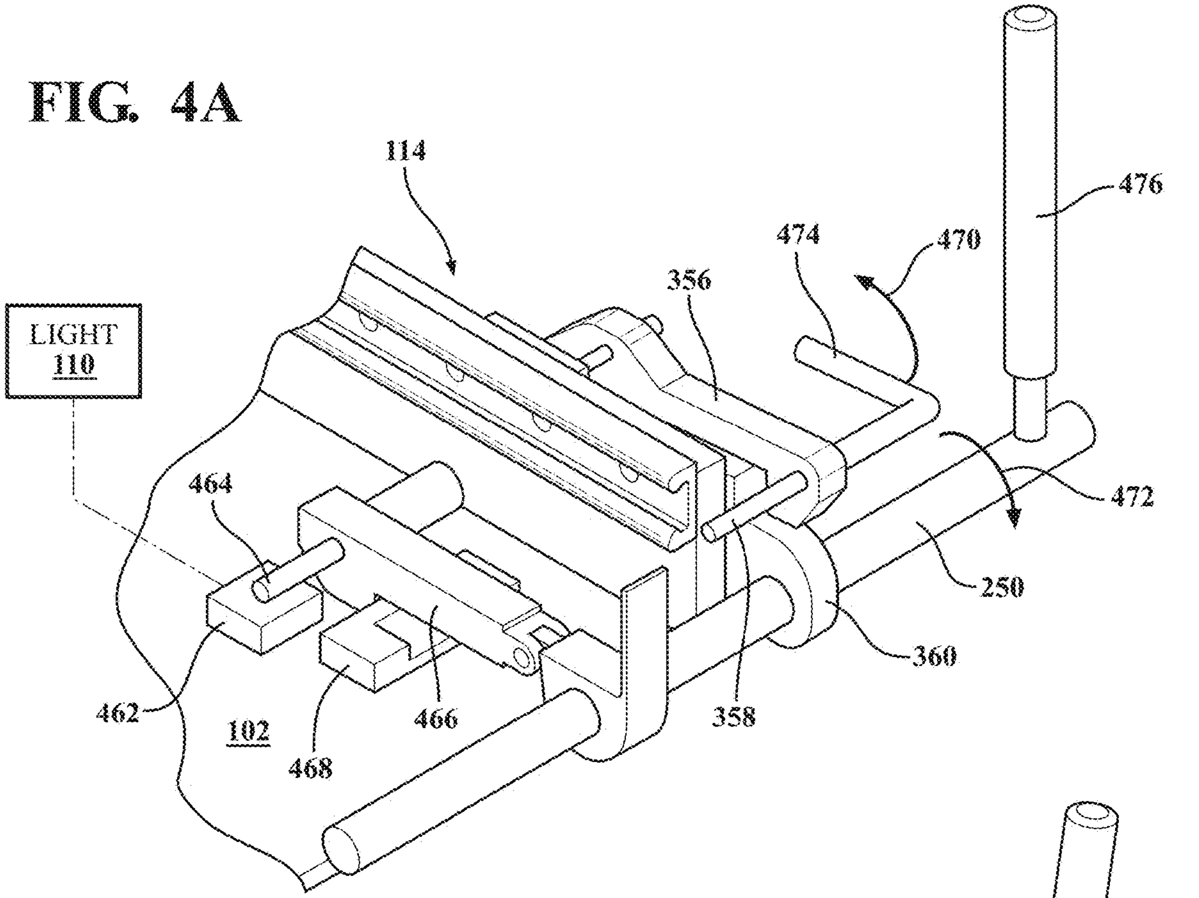
FIGS. 4A and 4B depict a locking system of the extendable gate in locked and unlocked states.
Figure 4B:
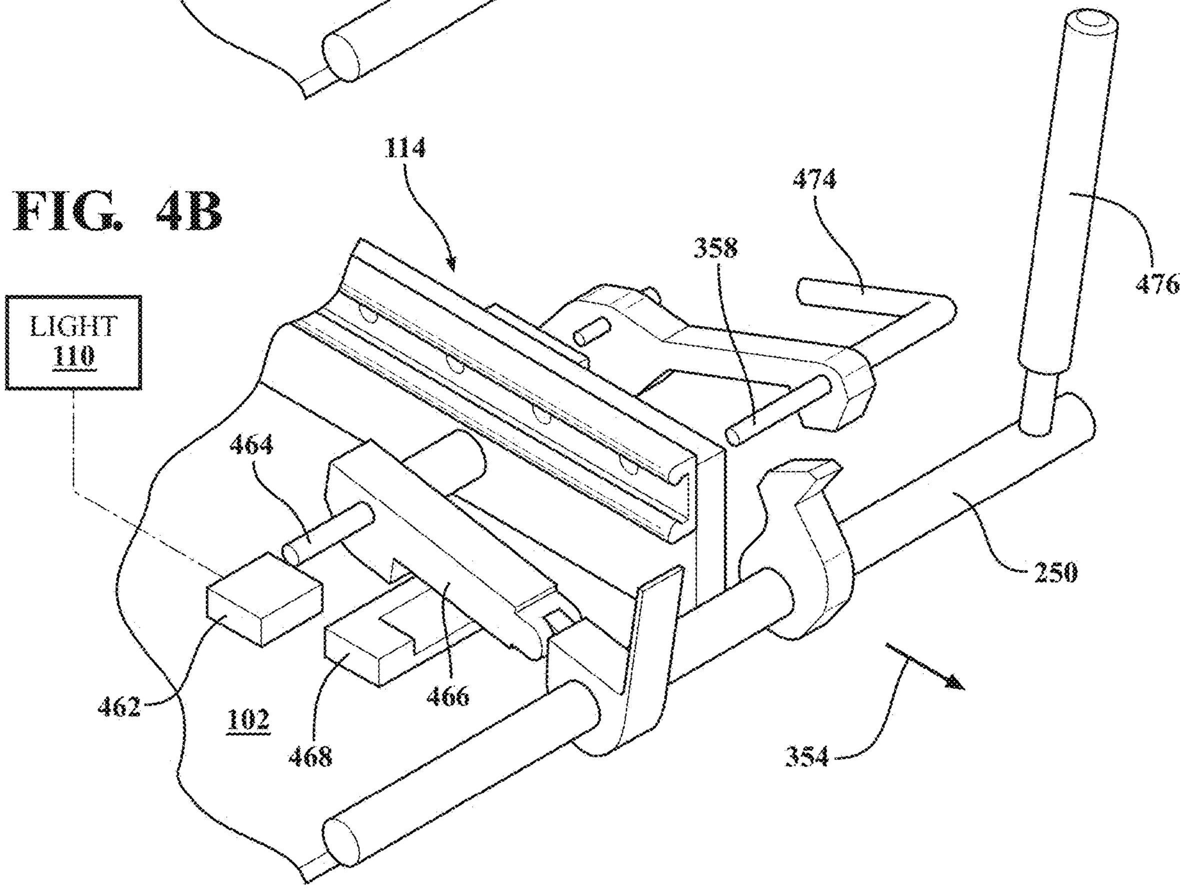

FIGS. 4A and 4B depict the locking system 114 of the extendable gate 104 in locked and unlocked states. As described above, the cargo platform 100 includes a locking system 114 per extendable gate 104 to retain an associated extendable gate 104 in a retracted position. In an example, the locking system 114 includes a first lock and a second lock. The first lock includes a locking hook 360 attached to a shaft 250 rotationally coupled to a distal end of the associated extendable gate 104. That is, as described above, a shaft 250 sits within lock shaft carrier bearings 248 that are rigidly affixed to the underside of the associated extendable gate 104. Via this rotational coupling, the shaft 250 and locking hook 360 may be rotated. The first lock also includes a stationary base-mounted component, specifically, a first latch 356 attached to a side surface of a vertically extending wall of the stationary base 102. As depicted in FIG. 4A, the first latch 356 interacts with the locking hook 360 to retain the associated extendable gate 104 in a retracted position. As described above, the pin 358 that interacts with the ratchet bar 252 is affixed to the first latch 356.

The locking system 114 includes a second lock. The second lock includes a second latch 466 that is attached to the shaft 250. As such, as the shaft 250 is rotated, so too are the locking hook 360 and the second latch 466. The second latch 466 interacts with a block 468 that protrudes vertically away from the stationary base 102 to retain the associated extendable gate 104 in the retracted position. Thus, the first and second locks prevent the translation of the associated extendable gate 104 in an extension direction 354. Specifically, the locking hook 360 interfaces with a hook on the first latch 356 to prevent this movement, and a look on the second latch 466 interfaces with an edge of the block 468 to prevent translation of the associated extendable gate 104 in the extension direction 354.

To extend the extendable gate 104, both the first lock and second lock are disengaged. Specifically, the first latch 356 in a first rotational direction 470, for example, via a handle 474 coupled to the first latch 356 raises the hook of the first latch 356 out of a path of motion of the extendable gate 104 along the extension direction 354. It should also be noted that when the gate is extended and the pin 358 is engaged with the teeth of the ratchet bar 252, rotation of the first latch 356 in this first rotational direction 470 disengages the pin 358 from the teeth such that the extendable gate 104 may be retracted.

Rotation of the shaft 250 in a second rotational direction 472, for example via a handle 476 coupled to the shaft 250, disengages the second latch 466 from the block 468. With both locks disengaged, an operator can now extend the extendable gate 104. The operator may do so by, for example, pulling the handle 476 in the extension direction 354. Thus, the locking system with multiple locks prevents the unintentional extension and retraction of the extendable gate 104 but allows for the extension and retraction of such by a simple multi-lock locking system.

FIGS. 4A and 4B also depict a limit switch which, as described above, provides a notification that the cargo platform 100 is in a retracted state. Specifically, the limit switch 462 interfaces with a contact rod 464 on the second latch 466. In an example, the limit switch 462 is positioned on the stationary base 102 such that the contact rod 464 reaches its location when the extendable gate 104 is in the fully retracted position. When the second latch 466 is seated over the block 468, the contact between the contact rod 464 and the limit switch 462 transmits an electrical signal to a notification device on a steerable wheeled base, such as a notification light 110 on a cargo dolly 108. When seated, as depicted in FIG. 4A, the light 110 may illuminate one color, such as green, thus providing visual indicia to an operator that the gates are correctly retracted and/or the cargo is safely loaded thereon, and the operator may move the cargo dolly 108. By comparison, when not seated, as depicted in FIG. 4B, the light 110 may illuminate another color, such as red, thus indicating that it is unsafe to operate the cargo dolly 108 as extendable gates 104 may not be properly seated and/or cargo may not be properly loaded/unloaded.

Figure 5A:
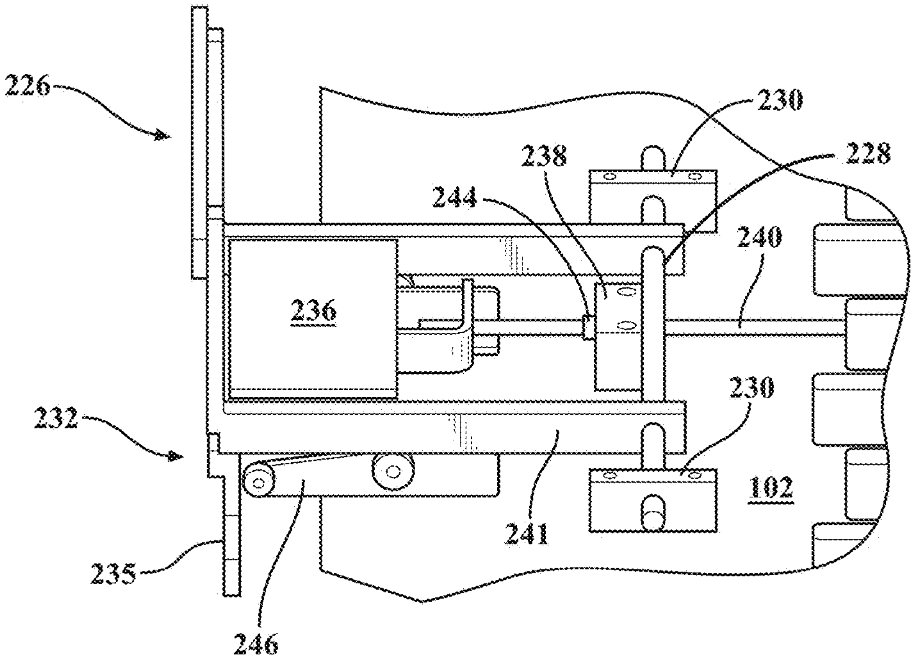
FIGS. 5A-5F depict the retraction and extension of guard rail risers as an extendable gate is extended and retracted.
Figure 5B:
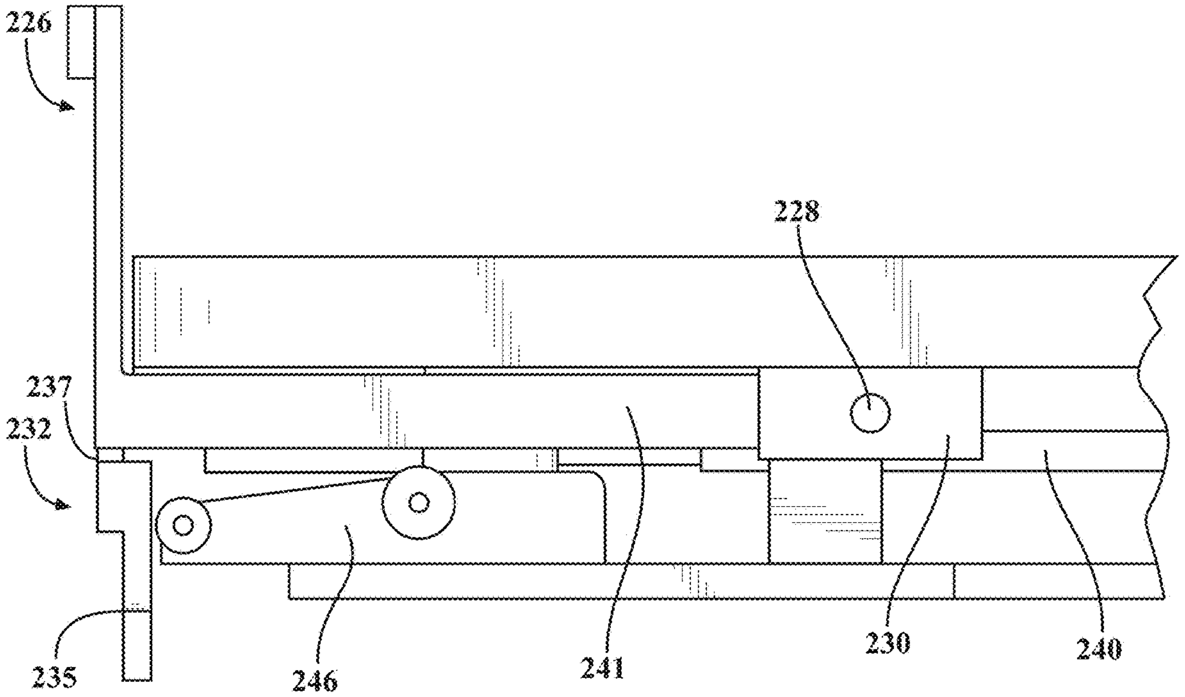
Figure 5C:
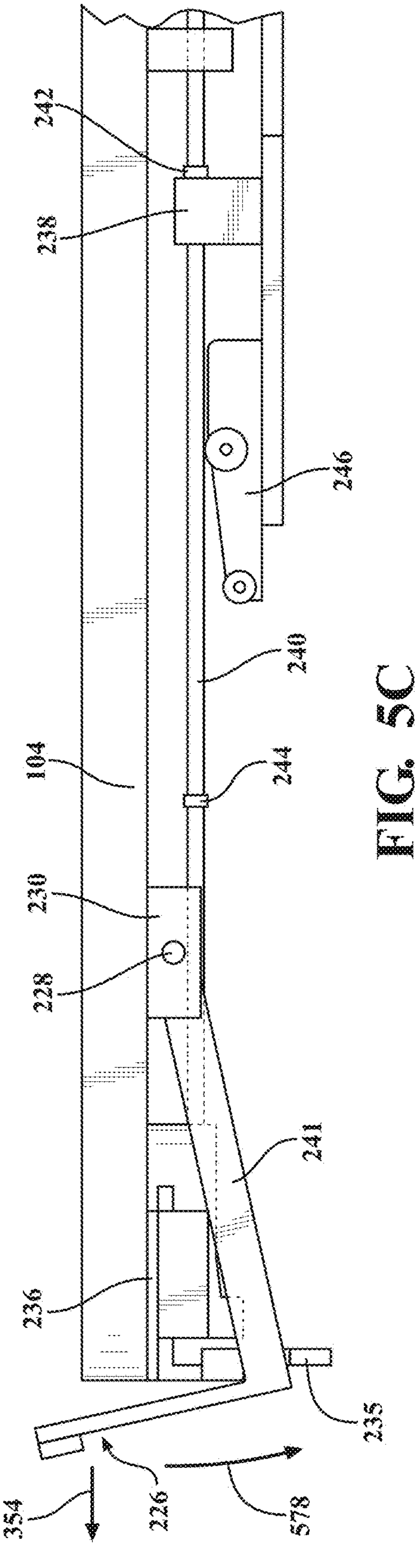
Figure 5D:
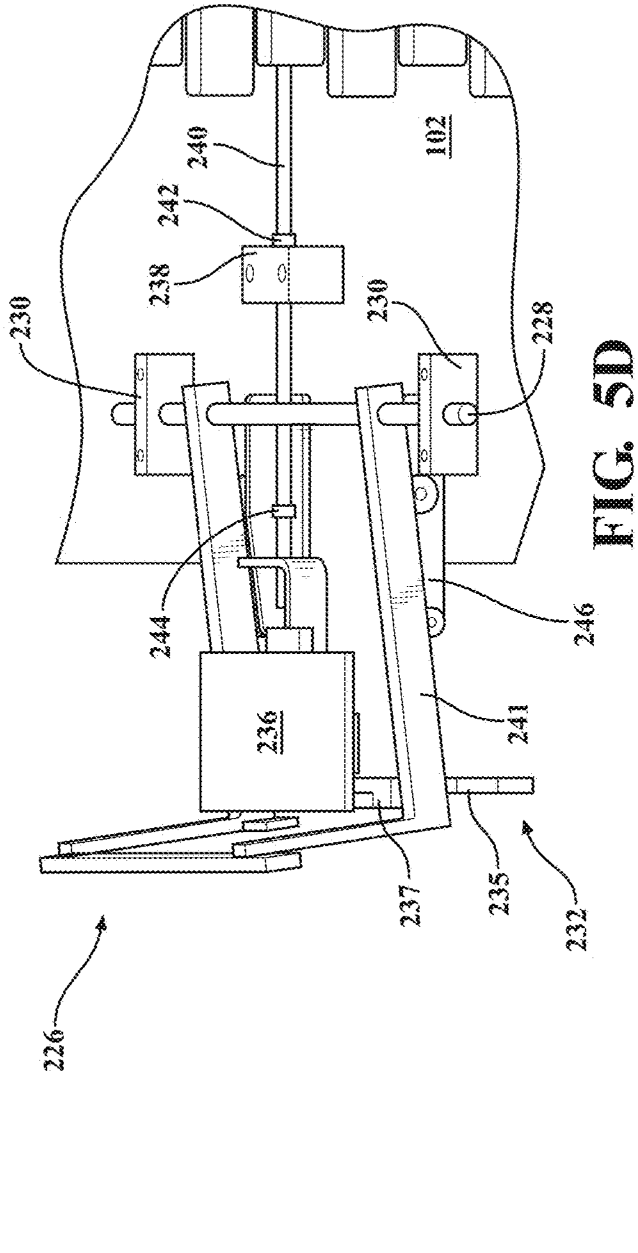
Figure 5E:
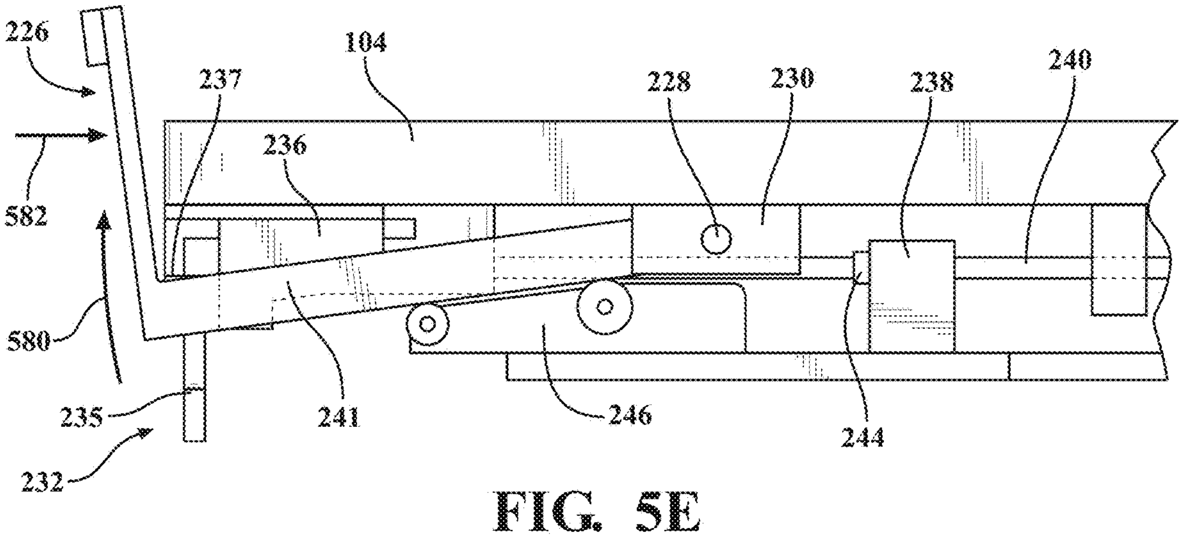
Figure 5F:
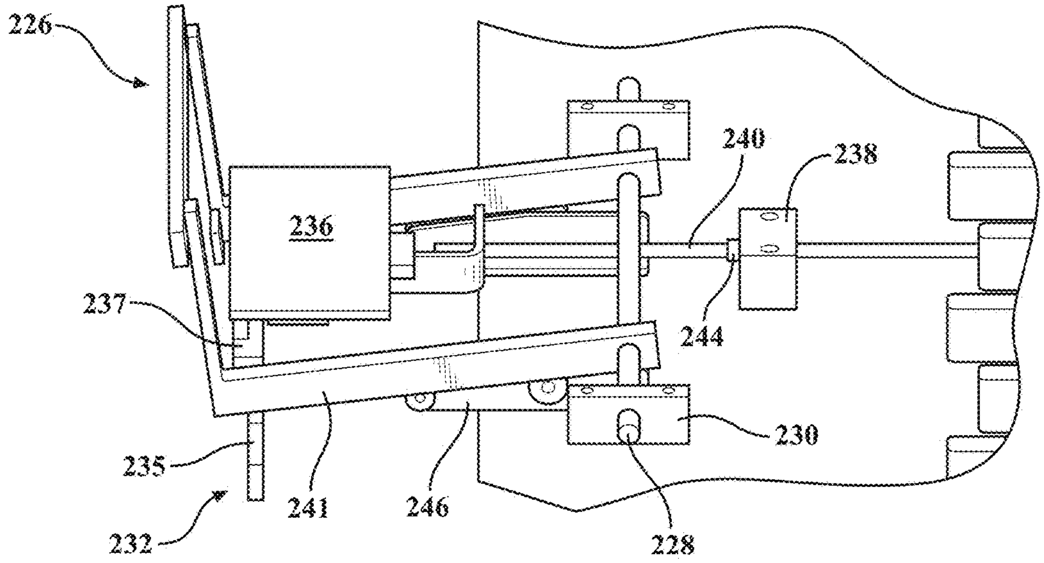

FIGS. 5A-5F depict the retraction/extension of guard rail risers 226 as an extendable gate 104 is extended and retracted. FIGS. 5A and 5B depict the risers 226 in a raised position, with the riser 226 sitting on an upper support 237 of the riser support 232. Specifically, as depicted in FIG. 2, the riser support 232 may include an upper support 237 and a lower support 235. When in the elevated position, horizontal catches 239 of the riser 226 sit on the upper support 237 of the riser support 232 as depicted in FIGS. 5A and 5B.

FIGS. 5A and 5B also depict the rotationally-supported mounting of the riser 226 to the extendable gate via the shaft 228 within the riser shaft carrier bearings 230. That is, as depicted below, the riser 226 rotates between raised and lowered positions. The shaft 228/riser shaft carrier bearing 230 interface facilitates this rotational movement.

FIGS. 5A and 5B also depict the tie rod 240 and slide block 238, which facilitate the lowering and raising of the riser 226. As described above, the tie rod 240 is rigidly attached to the riser support 232 while the slide block 238 is rigidly mounted on top of the stationary base 102. The slide block 238 includes an aperture through which the tie rod 240 may move to allow translation of the riser support 232 relative to the stationary base 102. A pair of collars 242 and 244 are rigidly attached to the tie rod 240 at predetermined locations.

FIGS. 5A and 5B also depict the support base 236 to which the riser support 232 is slidably mounted. That is, the support base 236 may include a slot that supports the riser support 232 but allows for the riser support 232 to slide relative to the support base 236, which base is affixed to the extendable gate 104.

For simplicity in illustration, various components of the locking systems 114 have been omitted from FIGS. 5A-5F. As depicted in FIGS. 5A and 5B, when in the elevated position, the arms 241 of the riser 226 do not contact the roller sets 246 of the guard rail system.

As described above, the vertically-extending risers 226 may retract underneath an associated extendable gate 104 as the associated extendable gate 104 extends laterally. Initially, as the extendable gate 104 is extended in an extension direction 354, the guard rail structure (i.e., the riser 226, riser support 232, support base 236, and tie rod 240) extends as well. However, at some point of lateral translation, a first collar 242 rigidly coupled to the tie rod 240 at a particular location contacts the slide block 238, which stops the tie rod 240 from further translating in the extension direction 354, all while the extendable gate 104, and the riser 226 which is coupled to the extendable gate 104, continue to translate in the extension direction 354. Given that the tie rod 240 is rigidly coupled to the riser support 232, the collar 242/slide block 238 interaction also stops the riser support 232 from translating further in the extension direction 354.

Based on the continued lateral translation of the gate 104/riser 226 and retention of the riser support 232, the horizontal catches 239 of the riser 226 fall off the upper support 237 of the riser support 232 in an arc 578 until the arms 241 of the riser 226 sit on the lower supports 235 of the riser support 232 as depicted in FIGS. 5C and 5D. In this fashion, the riser 226 is in a lowered position. Note that even though the top surface of the riser 226 appears to be elevated over the extendable gate 104, the extendable gate 104 may be covered with ball rollers, which ball rollers are at an elevation higher than the riser 226 such that cargo may be slid off the cargo platform 100 and onto the destination station. In this state, cargo may be loaded onto or off the cargo platform 100.

When the extendable gate 104 is pushed in a retraction direction 582 as depicted in FIGS. 5E and 5F, the above-described components operate to return the riser 226 to the raised position. Specifically, when the extendable gate 104 is translated in a retraction direction 582, the riser 226, riser support 232, and tie rod 240 are all translated in the retraction direction 582. As it is pushed along this route, the arms 241 of the riser 226, now in a lowered position compared to FIGS. 5A and 5B, are elevated by a roller set 246, thus raising the riser 226 in an arc 580 above and off of the lower supports 235 of the riser support 232 as depicted in FIGS. 5E and 5F.

Subsequently, at some point of lateral translation, a second collar 244 rigidly coupled to the tie rod 240 at a particular location contacts the slide block 238, which stops the tie rod 240 from further translating in the retraction direction 582, all while the extendable gate 104 and the riser 226 which is coupled to the extendable gate 104 continue to translate in the retraction direction 582. Given that the tie rod 240 is rigidly coupled to the riser support 323, the collar 242/slide block 238 interaction also stops the riser support 232 from translating further in the retraction direction 582.

Based on the continued lateral translation of the gate 104/riser 226 and retention of the riser support 232, the horizontal catches 239 of the riser 226 are brought over the upper support 237 and rest thereon as depicted in FIGS. 5A and 5B. In this fashion, the guard rail is returned to a raised state. As such, the cargo platform 100 of the current specification forms a bridge between a cargo dolly 108 loading surface and another location, such as an assembly lineside, where cargo is to be loaded/unloaded. The cargo platform 100 accommodates a wide variety of cargo with different sizes, weights, etc., and can bridge multiple distances.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5F, but the embodiments are not limited to the illustrated structure or application.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A cargo platform, comprising:
- a stationary base;
- a first extendable gate slidably coupled to the stationary base and comprising a first set of rails, the first extendable gate is extendable away from the stationary base in a first lateral direction;
- a second extendable gate slidably coupled to the stationary base and comprising a second set of rails, the second extendable gate is extendable away from the stationary base in a second lateral direction opposite the first lateral direction, wherein when the first and the second extendable gates are retracted, the second set of rails interlace with the first set of rails; and
- a locking system per extendable gate to retain an associated extendable gate in a retracted position.

2. The cargo platform of claim 1, wherein the stationary base is mounted to a top surface of a cargo dolly.

3. The cargo platform of claim 1, further comprising ball rollers on top surfaces of the first set of rails and the second set of rails.

4. A cargo platform, comprising:
- a stationary base;
- a first extendable gate slidably coupled to the stationary base and comprising a first set of rails, the first extendable gate is extendable away from the stationary base in a first lateral direction;
- a second extendable gate slidably coupled to the stationary base and comprising a second set of rails, the second extendable gate is extendable away from the stationary base in a second lateral direction opposite the first lateral direction, wherein when the first and the second extendable gates are retracted, the second set of rails interlace with the first set of rails; and
- a locking system per extendable gate to retain an associated extendable gate in a retracted position, wherein the locking system comprises:
- a first lock comprising:
  - a locking hook attached to a shaft rotationally coupled to a distal end of the associated extendable gate; and
  - a first latch attached to a side surface of a vertical wall extending from the stationary base, wherein:
    - the first latch interacts with the locking hook to retain the associated extendable gate in the retracted position; and
    - rotation of the first latch disengages the first latch from the locking hook; and
- a second lock comprising a second latch attached to the shaft, wherein:
  - the second latch interacts with a block protruding from the stationary base to retain the associated extendable gate in the retracted position; and
  - rotation of the shaft disengages the second latch from the block.

5. The cargo platform of claim 4, wherein:

rotation of the first latch in a first rotational direction disengages the first latch from the locking hook; and rotation of the shaft in a second rotational direction disengages the second latch from the block.

6. The cargo platform of claim 4, further comprising:

a slide stop attached to the stationary base to interface with rails of the associated extendable gate to define a stopping position of the associated extendable gate during retraction; and a limit switch to interface with a contact rod on the second latch, wherein the limit switch transmits an electrical signal to a notification device on a cargo dolly to which the stationary base is mounted when the second latch is seated on the block.

7. The cargo platform of claim 4, wherein:

the locking system further comprises:

a ratchet bar affixed to a side surface of the associated extendable gate; and a pin coupled to the first latch, the pin interacts with teeth of the ratchet bar to prevent retraction of the associated extendable gate; and rotation of the first latch in a first rotational direction while the associated extendable gate is extended disengages the pin from the ratchet bar.

8. The cargo platform of claim 1, further comprising:

a first vertically-extending guard rail assembly attached to a distal end of the first extendable gate; and a second vertically-extending guard rail assembly attached to a distal end of the second extendable gate.

9. A cargo platform, comprising:

a stationary base;

a first extendable gate slidably coupled to the stationary base and comprising a first set of rails, the first extendable gate is extendable away from the stationary base in a first lateral direction;

a second extendable gate slidably coupled to the stationary base and comprising a second set of rails, the second extendable gate is extendable away from the stationary base in a second lateral direction opposite the first lateral direction, wherein when the first and the second extendable gates are retracted, the second set of rails interlace with the first set of rails;

a first vertically-extending guard rail assembly attached to a distal end of the first extendable gate; and a second vertically-extending guard rail assembly attached to a distal end of the second extendable gate, wherein risers of vertically-extending guard rails retract underneath an associated extendable gate as the associated extendable gate extends laterally.

* * * * *